(12) United States Patent
Mohammed et al.

(10) Patent No.: US 11,034,880 B2
(45) Date of Patent: *Jun. 15, 2021

(54) OIL-BASED DRILLING FLUIDS FOR HIGH PRESSURE AND HIGH TEMPERATURE DRILLING OPERATIONS

(71) Applicants: Saudi Arabian Oil Company, Dhahran (SA); Durham University, Durham (GB); M-I Drilling Fluids UK Limited, Aberdeen (GB)

(72) Inventors: Musarrat Halima Mohammed, Glasgow (GB); Mona Al Batal, Durham (GB); Hugh Christopher Greenwell, Durham (GB); Andrew Whiting, Durham (GB); John Adrian Hall, Dhahran Hills (SA); Gasan Selman Alabedi, Cheshire (GB); Michael Hayward Hodder, Aberdeen (GB)

(73) Assignees: Saudi Arabian Oil Company, Dhahran (SA); Durham University, Durham (GB); M-I Drilling Fluids UK Limited, Aberdeen (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/825,489

(22) Filed: Mar. 20, 2020

(65) Prior Publication Data
US 2020/0216742 A1 Jul. 9, 2020

Related U.S. Application Data

(62) Division of application No. 16/055,867, filed on Aug. 6, 2018, now Pat. No. 10,640,696.
(Continued)

(51) Int. Cl.
C09K 8/36 (2006.01)
C09K 8/34 (2006.01)

(52) U.S. Cl.
CPC . *C09K 8/36* (2013.01); *C09K 8/34* (2013.01)

(58) Field of Classification Search
None
See application file for complete search history.

(56) References Cited

U.S. PATENT DOCUMENTS

| | | |
|---|---|---|
| 22,848 A | 2/1859 | Saml |
| 2,520,551 A | 8/1950 | Kilgore |

(Continued)

FOREIGN PATENT DOCUMENTS

| | | |
|---|---|---|
| CA | 2057024 A1 | 11/1990 |
| CN | 103032056 A | 4/2013 |

(Continued)

OTHER PUBLICATIONS

Nhlapo, Susan N., "Intercalation of fatty acids into layered double hydroxides" University of Pretoric, Oct. 1, 2008.
(Continued)

*Primary Examiner* — John J Figueroa
(74) *Attorney, Agent, or Firm* — Dinsmore & Shohl LLP

(57) ABSTRACT

Oil-based drilling fluid compositions comprising an oil phase comprising a base oil, an aqueous phase comprising water, at least one emulsifier, and one or more additives. The at least one emulsifier comprises an amino amide comprising the formula R—CO—NH—R'—NH—R"—NH$_2$, where R is a fatty acid alkyl and R' and R" are alkyl groups. The one or more additives are chosen from a wetting agent, a rheology modifier, a fluid-loss control additive, and a weighting additive. Methods of making the oil-based drill-
(Continued)

ing fluid compositions and methods of drilling a subterranean well utilizing the oil-based drilling fluid compositions are also provided.

15 Claims, 2 Drawing Sheets

Related U.S. Application Data

(60) Provisional application No. 62/545,516, filed on Aug. 15, 2017.

(56) References Cited

U.S. PATENT DOCUMENTS

| | | | |
|---|---|---|---|
| 3,125,517 A | 3/1964 | Voda | |
| 3,166,548 A | 1/1965 | Kirkpatrick et al. | |
| 3,539,518 A | 11/1970 | Feighner et al. | |
| 3,600,121 A | 8/1971 | Feldmann | |
| 3,676,344 A | 7/1972 | Kuceski | |
| 3,723,393 A | 3/1973 | Kistner | |
| 3,728,277 A | 4/1973 | Foley | |
| 4,368,276 A | 1/1983 | Park | |
| 4,374,737 A | 2/1983 | Larson et al. | |
| 4,501,672 A | 2/1985 | Connell et al. | |
| 4,664,843 A | 5/1987 | Burba, III et al. | |
| 4,749,563 A | 6/1988 | Georgalas | |
| 4,766,153 A | 8/1988 | Casciani | |
| 4,776,966 A | 10/1988 | Baker | |
| 5,079,203 A | 1/1992 | Pinnavaia et al. | |
| 5,094,778 A | 3/1992 | Burba, III et al. | |
| 5,196,143 A | 3/1993 | Burba, III et al. | |
| 5,250,727 A | 10/1993 | Fried | |
| 5,325,922 A | 7/1994 | Cowan et al. | |
| 5,709,976 A | 1/1998 | Malhotra | |
| 5,869,433 A | 2/1999 | Patel | |
| 5,874,024 A | 2/1999 | Knaus | |
| 6,172,151 B1 | 1/2001 | Johnston et al. | |
| 6,242,389 B1 | 6/2001 | Elliott et al. | |
| 6,365,639 B1 | 4/2002 | Hoy | |
| 6,395,686 B2 | 5/2002 | Crawford | |
| 6,437,031 B1 | 8/2002 | Lensvelt et al. | |
| 6,475,959 B1 | 11/2002 | Lange et al. | |
| 6,537,662 B1 | 3/2003 | Kamrath et al. | |
| 6,878,198 B1 | 4/2005 | Drappel et al. | |
| 6,894,007 B2 | 5/2005 | Klug et al. | |
| 7,098,351 B2 | 8/2006 | Hoong et al. | |
| 7,278,726 B2 | 10/2007 | Nagai | |
| 7,507,694 B2 | 3/2009 | Shumway et al. | |
| 7,741,248 B2 | 6/2010 | Mueller et al. | |
| 8,071,510 B2 | 12/2011 | Scoggins et al. | |
| 8,501,807 B2 | 8/2013 | You et al. | |
| 9,222,013 B1 | 12/2015 | Champagne et al. | |
| 9,315,621 B2 | 4/2016 | Chen et al. | |
| 9,815,222 B2 | 11/2017 | James et al. | |
| 10,640,696 B2 * | 5/2020 | Mohammed | C09K 8/34 |
| 10,647,903 B2 * | 5/2020 | Mohammed | C09K 8/032 |
| 10,676,658 B2 | 6/2020 | Mohammed et al. | |
| 2002/0009564 A1 | 1/2002 | Hall et al. | |
| 2002/0039666 A1 | 4/2002 | Nakamura | |
| 2003/0009834 A1 | 1/2003 | Ascione et al. | |
| 2004/0038892 A1 | 2/2004 | Finn et al. | |
| 2005/0048024 A1 | 3/2005 | Looker et al. | |
| 2006/0035999 A1 | 2/2006 | Bedford et al. | |
| 2006/0068086 A1 | 3/2006 | Reece et al. | |
| 2006/0088657 A1 | 4/2006 | Reece et al. | |
| 2006/0293192 A1 | 12/2006 | Lochel et al. | |
| 2007/0034825 A1 | 2/2007 | Wenderoth et al. | |
| 2007/0049500 A1 | 3/2007 | Mueller et al. | |
| 2007/0100040 A1 | 5/2007 | Chen et al. | |
| 2007/0116909 A1 | 5/2007 | Tweed et al. | |
| 2007/0140957 A1 | 6/2007 | Mohanty et al. | |
| 2007/0227404 A1 | 10/2007 | Plank et al. | |
| 2007/0265171 A1 | 11/2007 | Javora et al. | |
| 2008/0170978 A1 | 7/2008 | Duan et al. | |
| 2008/0182468 A1 | 7/2008 | Dharmarajan et al. | |
| 2010/0056647 A1 | 3/2010 | Graham et al. | |
| 2010/0279848 A1 | 11/2010 | Iyi et al. | |
| 2011/0076607 A1 | 3/2011 | Sugimoto et al. | |
| 2012/0067575 A1 | 3/2012 | Luyster et al. | |
| 2012/0129735 A1 * | 5/2012 | Dino | C09K 8/36 507/129 |
| 2012/0149805 A1 | 6/2012 | Elmore et al. | |
| 2012/0322694 A1 | 12/2012 | Monteiro et al. | |
| 2012/0325748 A1 | 12/2012 | Kasher et al. | |
| 2013/0035412 A1 | 2/2013 | Schmitz et al. | |
| 2013/0045898 A1 | 2/2013 | Witters et al. | |
| 2013/0267445 A1 | 10/2013 | Hendrickson | |
| 2014/0081045 A1 | 3/2014 | Reddington et al. | |
| 2014/0228269 A1 | 8/2014 | Masui et al. | |
| 2014/0231145 A1 | 8/2014 | Kverel et al. | |
| 2014/0255378 A1 | 9/2014 | Watkins et al. | |
| 2014/0284057 A1 | 9/2014 | Champagne et al. | |
| 2014/0329088 A1 | 11/2014 | Friedman et al. | |
| 2014/0338911 A1 | 11/2014 | Dismuke et al. | |
| 2015/0068755 A1 | 3/2015 | Hill et al. | |
| 2015/0175880 A1 | 6/2015 | Parris et al. | |
| 2015/0210914 A1 | 7/2015 | Muller et al. | |
| 2015/0361325 A1 | 12/2015 | Kimura et al. | |
| 2015/0376490 A1 | 12/2015 | Dino et al. | |
| 2016/0031910 A1 | 2/2016 | Maury et al. | |
| 2016/0096989 A1 | 4/2016 | Ngantung et al. | |
| 2016/0138349 A1 * | 5/2016 | Hale | E21B 21/066 210/696 |
| 2016/0264847 A1 | 9/2016 | Weerasooriya et al. | |
| 2017/0037296 A1 | 2/2017 | Kimura et al. | |
| 2017/0044421 A1 | 2/2017 | Parvulescu et al. | |
| 2017/0081580 A1 | 3/2017 | Maghrabi et al. | |
| 2019/0053993 A1 | 2/2019 | Wilson et al. | |
| 2019/0055446 A1 | 2/2019 | Al Batal et al. | |
| 2019/0055447 A1 | 2/2019 | Al Batal et al. | |
| 2019/0055460 A1 | 2/2019 | Mohammed et al. | |

FOREIGN PATENT DOCUMENTS

| | | |
|---|---|---|
| CN | 105623629 A | 6/2016 |
| EP | 0047370 A1 | 3/1982 |
| EP | 396983 A1 | 11/1990 |
| EP | 839850 A2 | 5/1998 |
| EP | 0906969 A1 | 9/1998 |
| EP | 945244 A1 | 9/1999 |
| JP | H022848 A | 1/1990 |
| RU | 2231534 C2 | 6/2004 |
| WO | 9523823 A1 | 9/1995 |
| WO | 0012458 A1 | 3/2000 |
| WO | 01/49406 A1 | 7/2001 |
| WO | 2004069240 A2 | 8/2004 |
| WO | 2014052510 A1 | 4/2014 |
| WO | 2014102602 A2 | 7/2014 |
| WO | 2015174974 A1 | 11/2015 |
| WO | 2016141968 A1 | 9/2016 |
| WO | 2017055789 A2 | 4/2017 |

OTHER PUBLICATIONS

Office Action dated Dec. 31, 2019 pertaining to U.S. Appl. No. 16/057,367, filed Aug. 7, 2018, 39 pgs.

Liang, et al. "Direct Synthesis of Unilamellar MgAl-LDH Nanosheets and Stacking in Aqueous Solution" Langmuir 2015, 31, 45, 12464-12471: (Year 2015).

Constantino, et al. "Basis Properties of $Mg_{2+1-x}$ layered Double Hydroxides Intercalated by Carbonate, Hydroxide, Chloride and Sulfate Anions" (Year: 1994).

Notice of Allowance and Fee(s) Due dated Jan. 31, 2020 pertaining to U.S. Appl. No. 16/055,881, filed Aug. 6, 2018, 12 pgs.

Notice of Allowance and Fee(s) Due dated Jan. 17, 2020 pertaining to U.S. Appl. No. 16/059,550, filed Aug. 9, 2018, 11 pgs.

Notice of Allowance and Fee(s) Due dated Jan. 17, 2020 pertaining to U.S. Appl. No. 16/059,558, filed Aug. 9, 2018, 11 pgs.

Office Action dated Feb. 3, 2020 pertaining to U.S. Appl. No. 16/057,378, filed Aug. 7, 2018, 10 pgs.

(56) References Cited

OTHER PUBLICATIONS

Office Action dated Feb. 21, 2020 pertaining to U.S. Appl. No. 16/100,829, filed Aug. 10, 2018, 8 pgs.
Examination Report dated Dec. 28, 2019 pertaining to GCC Application No. 2018-35835, filed Aug. 14, 2018, 3 pgs.
Office Action dated Mar. 16, 2020 pertaining to U.S. Appl. No. 16/100,836, filed Aug. 10, 2018, 11 pgs.
Office Action dated Mar. 19, 2020 pertaining to U.S. Appl. No. 16/055,890, filed Aug. 6, 2018, 38 pgs.
Examination Report pertaining to GCC Application No. 2018-35833 dated Apr. 20, 2020, 4 pgs.
Office Action dated Jul. 10, 2020 pertaining to U.S. Appl. No. 16/057,367, filed Aug. 7, 2018, 57 pgs.
Notice of Allowance and Fee(s) Due dated Aug. 20, 2020 pertaining to U.S. Appl. No. 16/100,829, filed Aug. 10, 2018, 38 pgs.
Notice of Allowance and Fee(s) Due dated Aug. 20, 2020 pertaining to U.S. Appl. No. 16/055,890, filed Aug. 6, 2018, 27 pgs.
Office Action dated Oct. 28, 2020 pertaining to U.S. Appl. No. 16/100,836, filed Aug. 10, 2018, 51 pgs.
JPH0317193 English Translation. (1991) (Year: 1991).
Notice of Allowance and Fee(s) Due dated Oct. 29, 2020 pertaining to U.S. Appl. No. 16/057,367, filed Aug. 7, 2018, 11 pgs.
Abdo, et al., "Clay nanoparticles modified drilling fluids for drilling of deep hydrocarbon wells", Applied Clay Science, vol. 86, pp. 76-82, 2013.
Abdou, et al., "Evaluation of Egyptian bentonite and nano-bentonite as drilling mud", Egyptian Journal of Petroleum, vol. 22, pp. 53-59, 2013.
Al-Salihi, "Synthesis of layered double hydroxide and their application in DSC", International Journal of Scientific & Engineering Research, vol. 7, Issue 1, pp. 694-698, Jan. 2016.
Askinadze et al., "Engineering of new crosslinked functional PEG micrometer-sized particles of narrow size distribution for enzyme immobilization", Polymer 54, pp. 2926-2934, 2013.
Ayawei et al., "Synthesis, Characterization and Application of Mg/Al Layered Double Hydroxide for the Degration of Congo Red in Aqueous Solution", Open Journal of Physical Chemistry, vol. 5, pp. 55-70, 2015.
Baruah et al., "The effect of particle size of clay on the viscosity build up property of mixed metal hydroxides (MMH) in the low solid-drilling mud compositions", Applied Clay Science, 80-81, pp. 169-175, 2013.
Dardir et al., "Preparton and evaluation of some esteramides as synthetic based drilling fluids", Egyptian Journal of Petroleum, vol. 23, pp. 35-43, 2014.
Dyer et al., "Synthesis and Structure of Phophatidylinositol Dimannoside", J. Org. Chem., vol. 72, pp. 3282-3288, 2007.
Eissa et al., "Synthesis of nonionic polymeric surfactants with amide oxime terminal groups", Journal of Basic and Environmental Sciences 4, pp. 94-106, 2017.
Fruijtier-Polloth, "Safety assessment on polyethylene glycols (PEGs) and their derivatives as used in cosmetic products", Toxicology 214, pp. 1-38, 2005.
Gluz et al., "Synthesis and characterization of new poly(ethylene glycol)bisphosphonate vinylic monomer and non-fluorescent and NIR-fluorescent bisphosphonate micrometer-sized particles", Polymer 54, pp. 565-571, 2013.
Growcock et al., "The Revolution in Non-Aqueous Drilling Fluids", AADE-11-NTCE-33, presentation at the 2011 AADE National Technical Conference and Exhibition, 2011.
Hermoso, et al., "Influence of viscosity modifier nature and concentratio non the viscous flow behaviour of oil-based drilling fludis at high pressure", Applied Clay Science 87, pp. 14-21, 2014.
Li, et al., "A new type of whole oil-based drilling fluid", Petroleum Exploration and Development, vol. 41, Issue 4, Aug. 2014.
Kim et al., "Thermal Evolution of the Structure of a Mg-Al-Co3 Layered Double Hydroxide: Sorption Reversibility Aspects", Ind. Eng. Chem. Res, vol. 43, pp. 4559-4570, 2004.
Krauss, et al., "Synthesis and Biological Evaluation of New Niphathesine Analogues", Arch. Pharm. Chem. Life Sci., 340, pp. 154-158, 2007.
Li, et al., "Rheological properties of hydrotalcite-like compounds/montmorillonite suspensions", Colloids and Surfaces A: Physichochem. Eng. Aspects, 304, pp. 14-17, 2007.
Liyi et al., "Effect of Gas Hydrate Drilling Fluids Using Low Solid Phase Mud System in Plateau Permafrost", Procedia Engineering 73, pp. 318-325, 2014.
Mao et al., "Hydrophobic associated polymer based silica nanoparticles composite with core-shell structure as a filtrate reducer for drilling fluid at ultra-high temperature", Journal of Petroleum Science and Engineering 129, pp. 1-14, 2015.
Mizrahi et al., "Novel Poly(ethylene glycol) Monomers Bearing Diverse Functional Groups", j. Polym. Sci., Part A: Polym. Chem. 48, pp. 5468-5478, 2010.
Ning et al., "Gas-hydrate formation, agglomeration and inhibition in oil-based drilling fluids for deep-water drilling", Journal of Natural Gas Chemistry 19, pp. 234-240, 2010.
Pivnicka et al., "Pressure gradient prediction of time-dependent drilling fluids and the effect of acceleration", Journal of Petroleum Science and Engineering 135, pp. 246-252, 2015.
Sakai et al., "Quaternary Ammonium-Type Gemini Surfactants Synthesized from Oleic Acid: Aqueous Solution Properties and Adsorption Characteristics", Journal of Oleo Science, vol. 62, No. 7, pp. 489-498, 2013.
Strachan, "Developing a High-Performance Oil-Base Fluid for Exploration Drilling", Oilfield Review Spring, vol. 26, No. 1, pp. 26-33, 2014.
Stanimirova et al., "Thermal evolution of Mg-Al-CO3 hydrotalcites", Clay Materials, vol. 39, pp. 177-191, 2004.
Tang, Boric Acid Catalyzed Amide Formation From Carboxylic Acids and Amines: N-Benzyl-4-Phenylbutyramide (Benzenbutanamide, N-(phenylmethyl)-), Organic Syntheses, vol. 81, pp. 262-272, 2005.
Traverso-Soto et al., "Distribution of anionic and nonionic surfactants in a sewage-impacted Mediterranean costal lagoon: Inputs and seasonal variations", Science of the Total Environment 503-504, pp. 87-96, 2015.
Vandevoorde et al., "Modifications of the Ethanolamine Head in N-Palmitoylethanolamine: Synthesis and Evaluation of New Agents Interfering with the Metabolism of Anandamide", J. Med. Chem. 46, pp. 1440-1448, 2003.
Vinardell et al., "The relationship between the chain length of non-ionic surfactants and their hemolytic action on human erythrocytes", Comparative Biochemistry and Physiology Part C 124, pp. 117-120, 1999.
Veronese et al., "The Impact of PEGylation of Biological Therapies", Buidrugs, vol. 22, Issue 5, pp. 315-329, 2008.
Wang et al., "New synthetic route to Mg-Al-CO3 layered double hydroxide using magnesite", Materials Research Bulletin 48, pp. 1228-1232, 2013.
Ying, "Fate, behavior and effects of surfactants and their degration products in the environment", Environment International 32, pp. 417-431, 2006.
Yldrim, "Metallic magnesium: an efficient catalyst toward N-aryl and N-alkyl substituted amides directly from aliphatic carboxylic acids", Monatsch Chem 146, pp. 947-951, 2015.
Zamanian et al., "Layered double hydroxides intercalated by long chain anions as oil phase gelling agent", Indian Journal of Chemical Technology, vol. 23, pp. 485-490, Nov. 2016.
Zhong et al., "Synergistic stabilization of shale by a mixture of polyamidomaine dendrimers modified bentonite with various generations in water-based drilling fluid", Applied Clay Science 114, pp. 359-369, 2015.
Zhuang et al., "Comparative study on the use of cationic-nonionic-organo-montmorillonite in oil-based drilling fluids", Applied Clay Science 1160117, pp. 257-262, 2015.
Search Report pertaining to International Patent Application PCT/US2018/045927 dated Oct. 30, 2018.
International Search Report and Written Opinion dated Oct. 31, 2018 pertaining to International Patent Application PCT/US2018/046204.
International Search Report and Written Opinion dated Oct. 31, 2018 pertaining to International Patent Application PCT/US2018/046009.

(56) References Cited

OTHER PUBLICATIONS

International Search Report and Written Opinion dated Oct. 25, 2018 pertaining to International Patent Application PCT/US2018/045569.

Interational Search Report and Written Opinion dated Nov. 27, 2018 pertaining to International Patent Application PCT/US2018/045907.

Costantino U. et al. "Preparation and characterization of hydrotalcite/carboxyadamantane intercalation compounds as fillers of polymeric nanocomposites" Journal of Materials Chemistry, Dec. 22, 2006, pp. 1079-1086, vol. 17, No. 11.

International Search Report and Written Opinion dated Nov. 27, 2018 pertaining to International Patent Application PCT/US2018/046220.

International Search Report and Written Opinion dated Dec. 20, 2018 pertaining to International Patent Application PCT/US2018/046226.

International Search Report and Written Opinion dated Oct. 24, 2018 pertaining to International Patent Application PCT/US2018/045765.

Office Action dated Sep. 20, 2019 pertaining to U.S. Appl. No. 16/055,881, filed Aug. 6, 2018, 28 pgs.

Office Action dated Sep. 19, 2019 pertaining to U.S. Appl. No. 16/059,550, filed Aug. 9, 2018, 29 pgs.

Office Action dated Sep. 19, 2019 pertaining to U.S. Appl. No. 16/059,558, filed Aug. 9, 2018, 28 pgs.

Office Action dated Sep. 20, 2019 pertaining to U.S. Appl. No. 16/055,867, filed Aug. 6, 2018, 28 pgs.

International Search Report and Written Opinion dated Nov. 27, 2018 pertaining to International application No. PCT/US2018/04621 filed Aug. 10, 2018, 8 pgs.

Notice of Allowance and Fee(s) Due dated Apr. 15, 2020 pertaining to U.S. Appl. No. 16/059,558, filed Aug. 9, 2018, 17 pgs.

Examination Report dated Feb. 5, 2020 pertaining to GCC Application No. 2018-35843, filed Aug. 14, 2018, 3 pgs.

Examination Report dated Feb. 17, 2020 pertaining to GCC Application No. 2018-35842, filed Aug. 14, 2018, 4 pgs.

Notice of Allowance and Fee(s) Due dated Jun. 4, 2020 pertaining to U.S. Appl. No. 16/057,378, filed Aug. 7, 2018, 37 pgs.

Notice of Allowance and Fee(s) Due dated Nov. 16, 2020 pertaining to U.S. Appl. No. 16/864,230, filed May 1, 2020, 48 pgs.

\* cited by examiner

OIL-BASED DRILLING FLUIDS FOR HIGH PRESSURE AND HIGH TEMPERATURE DRILLING OPERATIONS

CROSS-REFERENCE TO RELATED APPLICATIONS

This application claims priority to U.S. Non-Provisional application Ser. No. 16/055,867 filed Aug. 6, 2018, which claims the benefit of U.S. Provisional Application Ser. No. 62/545,516 filed Aug. 15, 2017, both of which are incorporated herein by reference.

TECHNICAL FIELD

Embodiments of the present disclosure generally relate to oil-based drilling fluids for use in high pressure and high temperature drilling operations. More specifically, embodiments of the present disclosure relate to oil-based drilling fluids comprising an emulsifier.

BACKGROUND

Drilling operations to drill a new wellbore for hydrocarbon extraction, for example, include the common practice of continuously circulating a drilling fluid (alternatively known as a drilling mud) through the wellbore during the drilling operation. The drilling fluid is pumped into the drill pipe to the bottom of the borehole where the drilling fluid then flows upwardly through the annular space between the wellbore wall and the drill pipe, and finally flows from the wellbore where it is recovered for secondary processing. Specifically, the drilling fluid is mechanically or chemically treated to remove captured solids and drill cuttings from the drilling fluid and before recirculation back through the wellbore.

Given the circulating nature of drilling fluid and its functionality in capturing solids and cuttings during drilling operations, drilling fluids must be free-flowing with a relatively low viscosity in order to facilitate pumping while having sufficient substance to retain and transport the cuttings and other solids and to suspend the weighting material so as to maintain a drilling fluid column of uniform density in the wellbore during static and circulating conditions. The drilling fluid must also have a gel strength sufficient to suspend the solids and cuttings if circulation of the drilling fluid is stopped to prevent accumulation of solids at the bottom of the wellbore. Solids accumulating at the bottom of the wellbore would potentially result in jamming of the drill as well as physical blockage of the drilling fluid's flow path.

Drilling in deep wells is complicated by geological conditions that involve high pressures and high temperatures (HPHT). As wellbores are increased in depth, the pressure and temperature at the base of the wellbore is elevated. The industry-defined definition of HPHT conditions typically include a wellbore temperature greater than 300° F. (149° C.) and a wellbore pressure greater than 10,000 psi (68.9 MPa). Elevated temperatures have a detrimental effect upon drilling fluids with breakdown of components unable to sustain the elevated temperatures. At elevated temperatures some drilling fluids may begin to solidify or experience viscosity increases that may impede circulation.

SUMMARY

Known drilling fluids typically contain emulsifiers, among other constituent components, that are not suitable for HPHT drilling because they decompose under HPHT conditions. Thus, there are ongoing needs for drilling fluids and included emulsifiers for drilling fluids that are thermally stable under HPHT conditions and while providing suitable rheological properties.

Embodiments of the present disclosure are directed to emulsifiers for oil-based drilling fluids, associated drilling fluid compositions comprising the emulsifier, and methods for making the oil-based drilling fluid.

According to one or more embodiments, an oil-based drilling fluid includes an oil phase which includes a base oil, an aqueous phase which includes water, at least one emulsifier, and one or more additives chosen from a wetting agent, a rheology modifier, a fluid-loss control additive, and a weighting additive. The at least one emulsifier comprises an amino amide comprising the formula R—CO—NH—R'—NH—R"—NH$_2$, where R is a fatty acid alkyl and R' and R" are alkyl groups.

According to another aspect, a method for making an oil-based drilling fluid includes mixing a base oil, at least one emulsifier, and optionally at least one wetting agent to form a first mixture. The emulsifier includes an amino amide having the formula R—CO—NH—R'—NH—R"—NH$_2$, where R is a fatty acid alkyl and R' and R" are alkyl groups. Additionally, the method includes optionally, mixing at least one rheology modifier, and alkalinity adjuster into the first mixture to form a second mixture, optionally, mixing at least one fluid-loss control additive into the second mixture to form a third mixture, mixing a brine solution into the first mixture or the third mixture to form a fourth mixture, and mixing a weighting additive into the fourth mixture to form the oil-based drilling fluid composition.

According to a further aspect, a method for drilling in a subterranean well includes providing an oil-based drilling fluid composition according to any one of the other aspects and operating a drill in a wellbore in the presence of the oil-based drilling fluid composition.

Additional features and advantages of the described embodiments will be set forth in the detailed description which follows, and in part will be readily apparent to those skilled in the art from that description or recognized by practicing the described embodiments, including the detailed description which follows and the claims.

BRIEF DESCRIPTION OF FIGURES

The following detailed description of the illustrative embodiments can be understood when read in conjunction with the following drawings.

DETAILED DESCRIPTION

Figure 1:
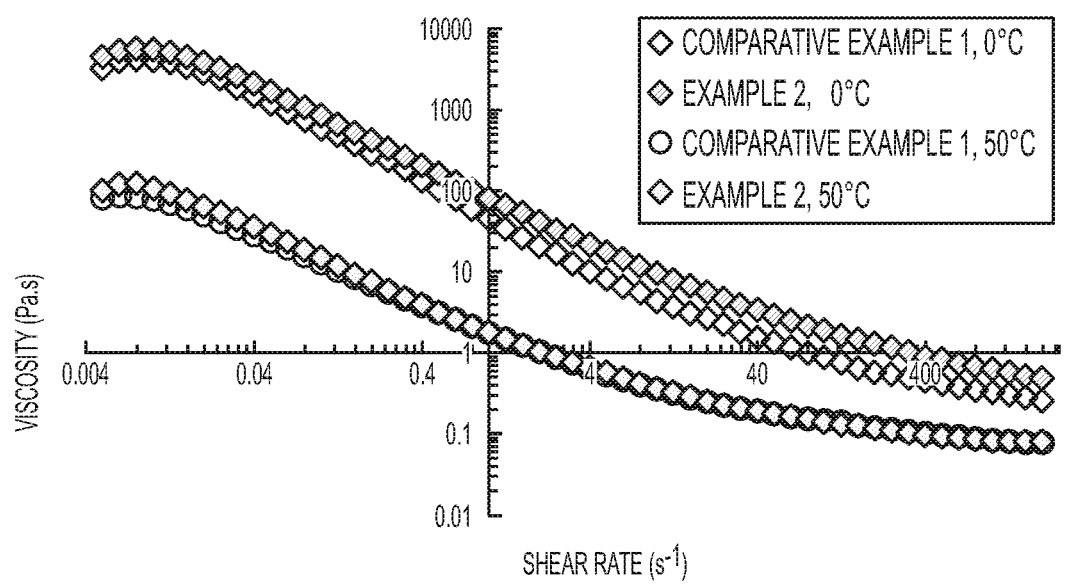
FIG. 1 provides a graph of the viscosities of various tested drilling fluids as a function of shear rate at both 0° C. and 50° C.

Embodiments of the present disclosure are directed to emulsifiers for oil-based drilling fluids and additionally oil-based drilling fluid compositions incorporating the disclosed emulsifiers. The oil-based drilling fluid is a combination of an oil phase, an aqueous phase, and at least one emulsifier. The emulsifier may comprise an amino amide comprising the formula R—CO—NH—R'—NH—R"—NH$_2$, where R is a fatty acid alkyl and R' and R" are alkyl groups. For convenience, the emulsifier comprising an amino amide having the formula R—CO—NH—R'—NH—R"—NH$_2$, where R is a fatty acid alkyl and R' and R" are alkyl groups, is alternatively also referred to as the Formula 1 emulsifier throughout this disclosure.

To drill a subterranean well, a drill string, including a drill bit and drill collars to weight the drill bit, is inserted into a predrilled hole and rotated to cause the drill bit to cut into the rock at the end of the hole. The drilling operation produces rock fragments. To remove the rock fragments from the end of the wellbore, a drilling fluid, such as the oil-based drilling fluid composition, is pumped downhole through the drill string to the drill bit. The drilling fluid cools the drill bit, provides lubrication, and lifts the rock fragments known as cuttings away from the drill bit. The drilling fluid carries the cuttings uphole as the drilling fluid is recirculated back to the surface. At the surface, the cuttings are removed from the drilling fluid through a secondary operation, and the drilling fluid is recirculated back downhole through the drill string to the end of the wellbore for collection of further cuttings. It will be appreciated by one skilled in the art that multiple terms familiar to those skilled in the art may be used to describe the same thing. For example, a subterranean well may alternatively be called a wellbore or borehole and usage of one term is meant to encompass each of the related terms as well.

Drilling fluids include drilling muds, packer fluids, suspension fluids and completion fluids. Generically, drilling fluids serve a number of functions with different types specializing in a particular function or functions. In one or more embodiments, the oil-based drilling fluid composition suspends the cuttings and weighting material and transports the cutting to the wellbore surface with the oil-based drilling fluid composition. Additionally, the oil-based drilling fluid composition may absorb gases in the wellbore, such as carbon dioxide (CO$_2$), hydrogen sulfide (H$_2$S), and methane (CH$_4$), and transport them to the wellbore surface for release, sequestration, or burn-off. The oil-based drilling fluid composition additionally provides buoyancy to the drill string relieving the tension on the drill string as the length of the wellbore increases. In one or more embodiments, the oil-based drilling fluid composition also provides a cooling and lubrication functionality for cooling and lubrication of the bit and drill string utilized in boring operations. In other embodiments, the oil-based drilling fluid composition also controls subsurface pressures. Specifically, the oil-based drilling fluid composition provides hydrostatic pressure in the wellbore to provide support to the sidewalls of the wellbore and prevent the sidewalls from collapsing and caving in on the drill string. Additionally, the oil-based drilling fluid composition provides hydrostatic pressure in the bore to prevent fluids in the downhole formations from flowing into the wellbore during drilling operations.

Under certain extreme downhole conditions, such as excessive temperature or difficult formations, some of the properties of the drilling fluid may be altered. For example, interaction of a drilling fluid with a formation having swelling clay, dispersible clay, or both, or subjecting the drilling fluid to extreme downhole temperatures may cause the drilling fluid to thicken or thin resulting in an excessive increase or decrease in viscosity, or any combination of these. For example, a drilling fluid utilized in high pressure and high temperature (HPHT) operations may experience a wellbore temperature greater than 300° F. (149° C.) and a wellbore pressure greater than 10,000 psi (68.9 MPa) which is the industry-defined definition of HPHT conditions. Under HPHT conditions, drilling fluids may decompose or experience undesirable changes in rheology. Additionally, gas influx into the wellbore may thin or chemically destabilize the drilling fluid. Evaporite formations may also destabilize the drilling fluid.

Embodiments of the oil-based drilling fluid composition are formulated to provide improved rheology. Specifically, the oil-based drilling fluid composition is formulated to comprise a greater viscosity at low shear rates than commercially available HPHT oil-based drilling fluids and a lesser viscosity at high shear rates than commercially available HPHT oil-based drilling fluids. As used in this disclosure, a low shear rate is defined as less than 10 inverse seconds (s$^{-1}$) and a high shear rate is defined as greater than 100 s$^{-1}$. The greater viscosity at low shear rates enables the oil-based drilling fluid composition to effectively hold cuttings when drilling operations are halted and retain the weighting material in suspension. Conversely, the lesser viscosity at high shear rates necessitates less power for circulation of the oil-based drilling fluid composition during drilling operations.

The oil-based drilling fluid includes at least one emulsifier. The emulsifier assists in the formation of an emulsion of the aqueous phase of the oil-based drilling fluid composition within the oil phase of the oil-based drilling fluid composition. The inclusion of the emulsifier in the oil-based drilling fluid compositions helps prevent separation of the oil phase and the aqueous phase and ensures that entrained solids remain dispersed in the oil phase. Emulsifiers also affect the performance of additives designed to viscosify the drilling fluid, such as organophilic clays.

In one or more embodiments, the emulsifier comprises an amino amide comprising the formula R—CO—NH—R'—NH—R"—NH$_2$ (Formula 1 emulsifier) and has a chemical structure as reflected infra.

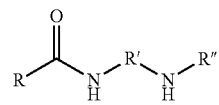

In one or more embodiments, the amount of the Formula 1 emulsifier in the drilling fluid composition may be from 0.05 weight percentage (wt. %) to 5 wt. %, from 0.1 wt. % to 2 wt. %, from 0.1 wt. % to 1.5 wt. %, from 0.1 wt. % to 1 wt. %, from 0.5 wt. % to 2.5 wt. %, from 0.5 wt. % to 2 wt. %, from 0.5 wt. % to 1.5 wt. %, from 0.5 wt. % to 1 wt. %, from 0.75 wt. % to 2.5 wt. %, from 0.75 wt. % to 2 wt. %, from 0.75 wt. % to 1.5 wt. %, from 0.75 wt. % to 1 wt. %, from 0.8 wt. % to 1.1 wt. %, from 0.8 wt. % to 1 wt. %, or from 0.9 wt. % to 1.1 wt. %, based on the total weight of the drilling fluid composition. The oil-based drilling fluid may include additional emulsifiers. Additional example emulsifiers include an invert emulsifier and oil-wetting agent for synthetic based drilling fluid systems such as LE SUPERMUL™ commercially available from Halliburton Energy Services, Inc. and MUL XT commercially available from M-I SWACO. LE SUPERMUL™ is a carboxylic acid terminated polyamide.

In one or more embodiments, the total amount of the emulsifier in the drilling fluid composition including both the Formula 1 emulsifier and additional emulsifiers may be from 0.05 wt. % to 5 wt. %, from 0.1 wt. % to 2.5 wt. %, from 0.1 wt. % to 1.5 wt. %, from 0.1 wt. % to 1 wt. %, from 0.5 wt. % to 2.5 wt. %, from 0.5 wt. % to 2 wt. %, from 0.5 wt. % to 1.5 wt. %, from 0.5 wt. % to 1 wt. %, from 0.75 wt. % to 2.5 wt. %, from 0.75 wt. % to 2 wt. %, from 0.75 wt. % to 1.5 wt. %, from 0.75 wt. % to 1 wt. %, from 0.8 wt. % to 1.1 wt. %, from 0.8 wt. % to 1 wt. %, or from 0.9 wt. % to 1.1 wt. %, based on the total weight of the drilling fluid composition.

In one or more embodiments, the R group in the amino amide comprising the formula R—CO—NH—R'—NH—R"—$NH_2$ comprises a fatty acid alkyl. In various embodiments, the R group may be $C_{15}H_{31}$, $C_{17}H_{35}$, $C_{21}H_{43}$ or $C_8H_{17}CHCHC_7H_{14}$.

In one or more embodiments, the R' group in the amino amide comprising the formula R—CO—NH—R'—NH—R"—$NH_2$ comprises an alkyl group. The term "alkyl," means a saturated straight or branched chain, substituted or unsubstituted hydrocarbon radical having from 1 to 500 carbon atoms. The term "$(C_1-C_{20})$alkyl" means a alkyl having 1 to 20 carbon atoms that is unsubstituted or substituted by one ore more $R^s$. In one or more embodiments, the R' group is an unsubstituted alkyl. Examples of unsubstituted $(C_1-C_{20})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. In one or more embodiments, the R' group is a substituted alkyl. Examples of substituted $(C_1-C_{20})$alkyl are substituted $(C_1-C_{20})$ alkyl, substituted $(C_1-C_{10})$alkyl, and trifluoromethyl. In various embodiments, the R' group comprises 2 to 12 carbon atoms, 2 to 6 carbon atoms, or 2 carbon atoms. In one or more embodiments, the R' group may be $C_2H_4$, $C_6H_{12}$ or $C_{10}H_{20}$.

In one or more embodiments, the R" group in the amino amide comprising the formula R—CO—NH—R'—NH—R"—$NH_2$ comprises an alkyl group. In one or more embodiments, the R" group is an unsubstituted alkyl. Examples of unsubstituted $(C_1-C_{20})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. In one or more embodiments, the R" group is a substituted alkyl. Examples of substituted $(C_1-C_{20})$alkyl are substituted $(C_1-C_{20})$ alkyl, substituted $(C_1-C_{10})$alkyl, and trifluoromethyl. In various embodiments, the R' group comprises 2 to 12 carbon atoms, 2 to 6 carbon atoms, or 2 carbon atoms. In one or more embodiments, the R' group may be $C_2H_4$, $C_6H_{12}$ or $C_{10}H_{20}$.

In one or more embodiments, the emulsifier comprises an amino amide comprising the formula R—CO—NH—R'—NH—R"—$NH_2$ where R is $C_{17}H_{35}$, R' is $C_2H_4$, and R" is $C_2H_4$.

In one or more embodiments, the emulsifier may have a hydrophilic-lipophilic balance (HLB) of 3 to 5. The HLB may be measured according to a standard technique, such as Griffin's method which states HLB=$20 \times M_h/M$ where $M_h$ is the molecular mass of the hydrophilic portion of the molecule and M is the molecular mass of the whole molecule. The resulting HLB value gives a result on a scale of from 0 to 20 in which a value of 0 corresponds to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble).

In one or more embodiments, the oil phase includes a base oil. The oil phase of the oil-based drilling fluids may include a synthetic oil or natural petroleum product as the base oil. The natural petroleum-derived product may include oils such as a diesel oil or a mineral oil. The synthetic oil may comprise an ester or olefin. Further, the synthetic oil or natural petroleum product may be composed of hydrocarbons such as n-paraffins, iso-paraffins, cyclic alkanes, branched alkanes, or mixtures thereof. Example base oils include DF-1 and EDC 99-DW available from Total S.A. (Paris, France) and Escaid™ 110 available from ExxonMobil Chemical Company (Spring, Tex., USA). In various embodiments, the oil-based drilling fluid composition may have from 10 wt. % to 40 wt. %, from 10 wt. % to 25 wt. %, from 10 wt. % to 18 wt. %, from 12 wt. % to 30 wt. %, from 12 wt. % to 25 wt. %, from 12 wt. % to 20 wt. %, from 12 wt. % to 18 wt. %, from 15 wt. % to 20 wt. %, from 15 wt. % to 19 wt. %, from 15 wt. % to 18 wt. %, or from 15 wt. % to 17 wt. % base oil based on the total weight of the oil-based drilling fluid composition.

The aqueous phase of the oil-based drilling fluid may include water and a salt source. In one or more embodiments, the water includes one or more of deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. In some embodiments, the aqueous phase may comprise a salt brine made up of water and a salt chosen from one or more of calcium chloride, calcium bromide, sodium chloride, sodium bromide, and combinations thereof, for example. The oil-based drilling fluid may contain from about 2 wt. % to about 10 wt. % aqueous phase, based on the total weight of the oil-based drilling fluid. In various embodiments, the oil-based drilling fluid composition may have from 2 wt. % to 8 wt. %, from 2 wt. % to 6 wt. %, from 2 wt. % to 5 wt. %, from 3 wt. % to 10 wt. %, from 3 wt. % to 8 wt. %, from 3 wt. % to 6 wt. %, from 4 wt. % to 10 wt. %, from 4 wt. % to 8 wt. %, from 4 wt. % to 6 wt. %, or from 4 wt. % to 5 wt. % aqueous phase, based on the total weight of the oil-based drilling fluid composition. In some embodiments, the oil-based drilling fluid may have an oil-to-water ratio by volume of from 50:50 to 95:5, from 75:20 to 95:5, from 85:15 to 95:5, or from 90:10 to 95:5, for example. The oil-to-water ratio of the oil-based drilling fluid composition is the volumetric ratio calculated as Oil:water=base oil+surfactant(s)+emulsifier(s)+wetting agent(s): water. The water component includes the aqueous part of all brines added plus any water present in other additives.

The oil-based drilling fluid composition also includes one or more additives. Example additives include a wetting agent, a rheology modifier, a fluid-loss control additive, and a weighting additive. The oil-based drilling fluid composition may also optionally include alkalinity adjusters, electrolytes, glycols, glycerols, dispersion aids, corrosion inhibitors, defoamers, and other additives or combinations of additives.

In embodiments, the oil-based drilling fluid composition may include a weighting additive to increase the density of the oil-based drilling fluid. Weighting additives may be used to control formation pressures and to help combat the effects of sloughing or heaving shales that may be encountered in stressed areas. Any substance that is denser than water and that does not adversely affect other properties of the drilling fluid can be used as a weighting material. In some embodiments, the weighting material may be a particulate solid having a specific gravity (SG) sufficient to increase the density of the drilling fluid composition by a certain amount without adding excessive weighting material such that the drilling fluid composition cannot be circulated through the wellbore. Examples of weight adjusting or density adjusting agents include barite ($BaSO_4$), galena (PbS), hematite ($Fe_2O_3$), magnetite ($Fe_3O_4$), manufactured iron oxide, ilmenite ($FeO.TiO_2$), siderite ($FeCO_3$), celesite ($SrSO_4$), dolomite ($CaCO_3.MgCO_3$), and calcite ($CaCO_3$).

The oil-based drilling fluid composition may include an amount of weighting additive sufficient to increase the density of the drilling fluid composition to allow the drilling fluid composition to support the wellbore and prevent fluids in downhole formations from flowing into the wellbore. In embodiments, the oil-based drilling fluid composition may include from 1 wt. % to 80 wt. % weighting additive based on the total weight of the oil-based drilling fluid composition. In some embodiments, the oil-based drilling fluid composition may include from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting additive based on the total weight of the oil-based drilling fluid composition. In some embodiments, the oil-based drilling fluid composition may include from 64 wt. % to 85.3 wt. % weighting additive based on the total weight of the oil-based drilling fluid composition.

In embodiments, the oil-based drilling fluid composition may include a rheology modifier, for example a viscosifier to impart non-Newtonian fluid rheology to the oil-based drilling fluid composition to facilitate lifting and conveying rock cuttings to the surface of the wellbore and to suspend the weighting material. Examples of viscosifiers may include, but are not limited to, organophilic clay, sepiolite, polyimide, dimeric or trimeric fatty acids, or combinations of these viscosifiers. In some embodiments, the oil-based drilling fluid composition may optionally include an organophilic hectorite clay, for example, VERSAGEL HT commercially available from MI-SWACO, Houston, Tex. In some embodiments, the oil-based drilling fluid composition may optionally include an additional or different organophilic clay, for example Bentone® 42 commercially available from Elementis Specialties Inc, Highstown, N.J. An example oil-based drilling fluid composition may optionally include from 0.1 wt. % to 2 wt. % of a rheology modifier based on the total weight of the oil-based drilling fluid composition. In some embodiments, the oil-based drilling fluid composition may optionally include from 0.25 wt. % to 0.5 wt. % of each of VERSAGEL HT and Bentone 42 based on the total weight of the oil-based drilling fluid composition. The oil-based drilling fluid composition may optionally include other suitable viscosifiers without deviating from the scope of the present subject matter.

The oil-based drilling fluid composition may optionally include at least one alkalinity adjuster. In embodiments, the oil-based drilling fluid composition may optionally include at least one alkaline compound to adjust the alkalinity of the oil-based drilling fluid composition. Examples of alkaline compounds may include, but are not limited to, lime (calcium hydroxide or calcium oxide), soda ash (sodium carbonate), sodium hydroxide, potassium hydroxide, other strong bases, or combinations of these alkaline compounds. It is noted that conjugate bases to acids with a $pK_a$ of more than about 13 are considered strong bases. The alkaline compounds may react with gases, such as $CO_2$ or $H_2S$ for example, encountered by the drilling fluid composition during drilling operations to prevent the gases from hydrolyzing components of the oil-based drilling fluid composition. Some example oil-based drilling fluid compositions may optionally include from 0.1 wt. % to 2 wt. %, 0.4 wt. % to 1.8 wt. %, or 0.6 wt. % to 1.5 wt. % lime. In embodiments, the oil-based drilling fluid composition may have an alkalinity of 0 to 15 grams per liter (g/L) excess line.

In one or more embodiments, surfactants such as wetting agents may be added to enhance the stability of suspensions or emulsions in the oil-based drilling fluid composition. Suitable wetting agents may include fatty acids, organic phosphate esters, modified imidazolines, amidoamines, alkyl aromatic sulfates, and sulfonates. For example, SUREWET®, which is commercially available from M-I SWACO, Houston, Tex., is an oil based wetting agent and secondary emulsifier that may be used to wet fines and drill solids to prevent water-wetting of solids. Moreover, SUREWET® may improve thermal stability, rheological stability, filtration control, emulsion stability of wellbore fluids. VERSAWET®, which is commercially available from M-I LLC, Houston, Tex., is a further wetting agent and is especially effective in difficult to wet hematite systems. An example oil-based drilling fluid composition may optionally include from 0.1 wt. % to 2 wt. % of a wetting agent based on the total weight of the oil-based drilling fluid composition. In some embodiments, the oil-based drilling fluid composition may optionally include from 0.25 wt. % to 0.75 wt. % of each of SUREWET® based on the total weight of the oil-based drilling fluid composition. The oil-based drilling fluid composition may optionally include other suitable wetting agents without deviating from the scope of the present subject matter.

In one or more embodiments, fluid-loss control agents may be added to the oil-based drilling fluid composition to reduce the amount of filtrate lost from the oil-based drilling fluid composition into a subsurface formation. Examples of fluid-loss control agents include organophilic (for example, amine-treated) lignite, bentonite, manufactured polymers, and thinners or deflocculants. When fluid-loss control agents are used, they may comprise from about 0.5 wt. % to about 3.0 wt. % of the oil-based drilling fluid composition, based on the total weight of the drilling fluid. In various embodiments, fluid-loss control agents may comprise from about 0.5 wt. % to about 1.5 wt. %, 0.5 wt. % to about 1.25 wt. %, 0.75 wt. % to about 2 wt. %, 0.75 wt. % to about 1.5 wt. %, 0.75 wt. % to about 1.25 wt. %, 1 wt. % to about 2 wt. %, 1 wt. % to about 1.5 wt. %, or 1 wt. % to about 1.25 wt. % of the oil-based drilling fluid composition, based on the total weight of the drilling fluid. Example fluid-loss control agents include VERSATROL™, VERSALIG™, ECOTROL™ RD, ONETROL™ HT, EMI 789, and NOVATECH™ F, all commercially available from MI SWACO, Houston, Tex., and ADAPTA® which is commercially available from Halliburton Energy Services, Inc. In some embodiments, the oil-based drilling fluid composition may optionally include both ONETROL™ HT and ECOTROL™ RD in about a 10:1 weight ratio respectively.

Optional suspending agents may be added to the oil-based drilling fluid composition to adjust the viscosity of the oil-based drilling fluid composition at a low shear rate sufficient to suspend all of the drilling fluid components, by which the settling of components of the oil-based drilling fluid composition may be avoided. Examples of suspending agents include fatty acids and fibrous materials. When suspending agents are used, they may compose from about 0.0 wt. % to about 1.0 wt. % or 0.01 to 0.5 wt. % of the oil-based drilling fluid composition, based on the total weight of the drilling fluid.

To maintain suspension of solids and cuttings in the oil-based drilling fluid composition during low speed drilling or between drilling operations, viscosity greater than a threshold at lesser shear rates is advantageous. In one or more embodiments, the oil-based drilling fluid has a viscosity greater 400 cP at a shear rate of 10.22 seconds$^{-1}$ (s$^{-1}$) measured at 50° C. In various embodiments, the oil-based drilling fluid has a viscosity greater than 410 cP, greater than 420 cP, greater than 430 cP, or greater than 440 cP at a shear rate of 10.22 s$^{-1}$ measured at 50° C. and atmospheric pressure. Conversely, it is advantageous to also limit the viscosity of the oil-based drilling fluid composition at lesser shear rates to avoid excess energy or force required to initiate or maintain drilling fluid circulation. In various embodiments, the oil-based drilling fluid has a viscosity less than 1500 cP, less than 1000 cP, less than 800 cP, or less than 600 cP at a shear rate of 10.22 s$^{-1}$ measured at 50° C.

Once drilling operations have commenced and the oil-based drilling fluid composition is circulating, the circulation of the oil-based drilling fluid composition assists in maintaining suspension of solids and cuttings in the oil-based drilling fluid composition. To avoid excess energy requirements for oil-based drilling fluid composition circulation and to avoid applying excess pressure to the formations exposed in the borehole via the effect of the equivalent circulating density, it is advantageous for the viscosity of the oil-based drilling fluid composition to be less than a threshold at greater shear rates. In one or more embodiments, the oil-based drilling fluid has a viscosity less than 125 cP at a shear rate of 170 s$^{-1}$ measured at 50° C. and atmospheric pressure. In various embodiments, the oil-based drilling fluid has a viscosity less than 122 cP, less than 120 cP, less than 118 cP, or less than 115 cP at a shear rate of 170 s$^{-1}$ measured at 50° C.

Having previously described the oil-based drilling fluid compositions according to various embodiments, illustrative methods for preparing the oil-based drilling fluid compositions will now be described. The methods for preparing the oil-based drilling fluids may include mixing a base oil, at least one emulsifier, and at least one wetting agent to form a first mixture, in which the at least one emulsifier comprises an amino amide comprising the formula R—CO—NH—R'—NH—R"—NH$_2$, where R is a fatty acid alkyl and R' and R" are alkyl groups. The ingredients of the first mixture may be added to provide amounts previously described with regard to embodiments of the oil-based drilling fluid compositions. The methods for preparing the oil-based drilling fluid compositions may optionally include mixing at least one rheology modifier and alkalinity adjuster into the first mixture to form a second mixture. Again, the ingredients of the second mixture may be added to provide amounts previously described with regard to embodiments of the oil-based drilling fluid compositions. The methods for preparing the oil-based drilling fluid compositions may optionally include mixing at least one fluid-loss control additive into the second mixture to form a third mixture. Again, the ingredients of the third mixture may be added to provide amounts previously described with regard to embodiments of the oil-based drilling fluid compositions. The methods for preparing the oil-based drilling fluid compositions may further include mixing a brine solution into the first mixture or third mixture to form a fourth mixture. The ingredients of the fourth mixture may be added to provide amounts previously described with regard to embodiments of the oil-based drilling fluid compositions. The methods for preparing the oil-based drilling fluid compositions may further include mixing a weighting additive into the fourth mixture to form the oil-base drilling fluid composition. The ingredients of the oil-based drilling fluid composition may be added to provide amounts previously described with regard to embodiments of the oil-based drilling fluid compositions.

The oil-based drilling fluid compositions previously described, may be well-suited for use in drilling operations on subterranean formations, particularly for drilling operations performed under HPHT conditions of a wellbore pressure greater than 10,000 psi and a wellbore temperature greater than 300° F. (149° C.). Accordingly, embodiments of methods for drilling in a subterranean well under high-pressure high-temperature conditions may include providing an oil-based drilling fluid composition according to any embodiment described in this specification. The method for drilling in a subterranean well under high-pressure high-temperature conditions comprises operating a drill in a wellbore in the presence of the oil-based drilling fluid composition.

EXAMPLES

The following examples illustrate one or more additional features of the present disclosure. It should be understood that these examples are not intended to limit the scope of the disclosure or the appended claims in any manner.

Experimental Procedures

The general procedure for preparation of the amino amide emulsifier comprising the formula R—CO—NH—R'—NH—R"—NH$_2$ (Formula 1 emulsifier) in accordance with this disclosure includes adding 0.28 grams (g) of 1 millimole (mmol) fatty acid (stearic acid), 3.09 milligrams (mg) of 0.05 mmol boric acid, and 3 milliliters (ml) of toluene to a flask equipped with Dean-Stark trap topped with a reflux condenser. Subsequently, 0.12 g of 1.1 mmol amino amine (diethylenetriamine) was added to the reaction mixture under stirring. The reaction mixture was heated at reflux overnight (approximately 14 to 16 hours). The mixture was allowed to cool to room temperature and then was poured with stirring into hexane leading to the immediate precipitation of a solid which was filtered off and washed with hexane to afford the desired amino amide emulsifier comprising the formula R—CO—NH—R'—NH—R"—NH$_2$ in accordance with embodiments of this disclosure.

To compare the physical and rheological properties of a drilling fluid containing the Formula 1 emulsifier with those of a drilling fluid containing an industry standard emulsifier, two drilling fluids were prepared. The two drilling fluids were based on the M-I SWACO RHADIANT™ system that includes a blend of proprietary emulsifiers, wetting agents, and fluid-loss control agents specially tailored for oil-based fluid formulations. Specifically, a comparative drilling fluid, Comparative Example 1, was prepared using SUREMUL®, as an emulsifier. A second drilling fluid, Example 2, was prepared by replacing SUREMUL® with the Formula 1 emulsifier. It is noted that the Formula 1 emulsifier was reduced by 25% from the quantity of SUREMUL® in the replacement because SUREMUL® is 75% emulsifier dissolved in the base oil and the Formula 1 emulsifier was pure emulsifier.

The Comparative Example 1 and Example 2 drilling fluids were formulated using the following ingredients: Saraline 185V, a synthetic oil drilling base fluid, available from Shell; SUREMUL®, an amidoamine surfactant, available from M-I SWACO, LLC (Houston, Tex., USA); SUREWET®, a wetting agent, available from M-I SWACO, LLC (Houston, Tex., USA); MUL XT, an emulsifier for use in non-aqueous fluid systems, available from M-I SWACO, LLC (Houston, Tex., USA); VERSAGEL HT, a hectorite clay viscosifier for aiding in filtration control, available from M-I SWACO, LLC (Houston, Tex., USA); ONE-TROL™ HT, an amine-treated tannin filtration control additive designed for use in oil and synthetic-base drilling fluid systems, available from M-I SWACO, LLC (Houston, Tex., USA); ECOTROL RD, a filtration control additive designed for use in oil and synthetic-base drilling fluid systems, available from M-I SWACO, LLC (Houston, Tex., USA); and barite ($BaSO_4$) weighting agent, available from M-I SWACO, LLC (Houston, Tex., USA).

The Comparative Example 1 and Example 2 drilling fluids were prepared in 30.88 g and 25.98 g quantities respectively using a magnetic stir bar. The formulations for the Comparative Example 1 and Example 2 drilling fluids are provided in Table 1. To prepare the drilling fluids, the base oil, emulsifiers, and wetting agents were mixed together first for 10 minutes during stage 1. Specifically, SUREMUL® was added to Comparative Example 1 as an emulsifier and the Formula 1 emulsifier was added to Example 2 as an emulsifier. Then the viscosity modifiers and rheology modifiers were added and mixed for another 20 minutes during stage 2. Next, in stage 3 the fluid-loss control additives were added and mixed for 20 minutes, followed by brine and fresh water in stage 4 and barite in stage 5, which were mixed for 30 minutes and 40 minutes, respectively. The quantity of base oil used and barite as a wt. % were slightly different for Comparative Example 1 and Example 2 to provide a specific gravity of 2.20 and an oil/water ratio of 90.0, for both Comparative Example 1 and Example 2.

TABLE 1

Formulation and Mixing Procedure for HPHT Oil-Based Drilling Fluids

| Ingredient | Function | Comparative Example 1 (wt. %) | Example 2 (wt. %) | Mixing Order and Time |
|---|---|---|---|---|
| Saraline 185V | Base Oil | 15.805 | 16.094 | Stage 1 |
| SUREMUL | Emulsifier | 1.296 | 0 | (10 min) |
| Formula 1 Emulsifier | Emulsifier | 0 | 0.972 | |
| SUREWET | Wetting Agent | 0.518 | 0.519 | |
| MUL XT | Emulsifier | 0.518 | 0.519 | |
| VERSAGEL HT | Rheology Modifier | 0.356 | 0.357 | Stage 2 (20 min) |
| Bentone 42 | Rheology Modifier | 0.356 | 0.357 | |
| Lime | Alkalinity Modifier | 0.777 | 0.778 | |
| ONE-TROL HT | Fluid Loss Control Additive | 1.036 | 1.038 | Stage 3 (20 min) |
| ECOTROL RD | Fluid Loss Control Additive | 0.104 | 0.104 | |
| $CaCl_2$ brine | Internal Phase | 3.692 | 3.735 | Stage 4 (30 min) |
| Fresh water | Internal Phase | 0.764 | 0.778 | |
| Barite | Weighting Agent | 74.777 | 74.750 | Stage 5 (40 min) |
| Total | | 99.999 | 100.001 | 120 min |
| Specific Gravity | | 2.20 | 2.20 | |
| Oil/Water Ratio (volumetric) | | 90.0 | 90.0 | |

The Comparative Example 1 and Example 2 drilling fluids were left statically after mixing for 17 hours and then were inspected for sagging and fluid separation prior to rheology measurements. Fluid separation and sagging were inspected visually. Specifically, inspection of visual separation of solids and liquid was undertaken. Sagging was also examined by inserting a micro spatula into the mud to check if the mud was of similar texture (subjectively hard or soft) throughout from top to bottom and if there was separation and settlement of solids such that solids were no longer homogenously distributed throughout the drilling fluid. If there was sagging, as evidenced by separation and settlement of the solids, then the mud would appear softer at the top and become harder at the bottom of the vessel in which the drilling fluid was statically left.

The viscosities of the drilling fluids were tested using a stress and strain controlled rheometer (Discover Hybrid Rheometer from TA Instrument, New Castle, Del.). The geometry utilized in the rheometer was 25 mm rough stainless steel parallel plates. This geometry was selected due to the presence of barite in the sample. This geometry with a roughened surface was selected to minimize slip between the drilling fluid and plates due to the presence of barite in the sample. The gap between the stainless steel plates was set at 300 μm. Viscosity measurements as a function of shear rate were carried out from 0.004 to 2000 $s^{-1}$ at 0° C. and 50° C. at atmospheric pressure. When no force was applied, the Comparative Example 1 and Example 2 drilling fluids gelled and were strong enough to hold drill solids and weighting materials such as barite. Shear rate experiments provide useful viscosity information of the fluid and whether the fluid has zero shears or is shear thinning. The shear rate experiments also indicated shear rate at which the drilling fluids deform.

Results from the viscosity testing, % Strain, Sagging, and the fluid separation testing, are provided in Tables 2 and 3.

TABLE 2

HPHT Oil-Based Drilling Fluids: Viscosities at 50° C.

| Oil-Based Drilling Fluid at 50° C. | Viscosity at shear rate of 10.22 $s^{-1}$ | Viscosity at shear rate of 170 $s^{-1}$ |
|---|---|---|
| Comparative Example 1 | 358 | 128 |
| Example 2 | 444 | 111 |

With reference to FIG. 1 and Table 2, both Comparative Example 1 and Example 2 exhibited shear-thinning behavior regardless of their formulation and temperature at testing. However, at 50° C., Example 2 had greater viscosity at low shear rates of 10.22 $s^{-1}$ than Comparative Example 1 at the same temperature and shear rate, thus allowing the Example 2 drilling fluid to better hold solids while stationary than the Comparative Example 1 drilling fluid. Conversely, at 50° C. Example 2 had lesser viscosity at high shear rates of 170 $s^{-1}$ than Comparative Example 1 at the same temperature and shear rate. The lesser viscosity of Example 2 translates to a requirement for less energy to circulate the drilling fluid during drilling operations than that which would be required for Comparative Example 1. The viscosity of the Example 2 drilling fluid becomes less than the viscosity of the Comparative Example 1 drilling fluid at approximately 95 to 100 $s^{-1}$ and Example 2 and Comparative Example 1 have similar viscosities around the shear rates of 80 $s^{-1}$. The relative viscosities of Example 2 and Comparative Example 1 at 50° C. indicates Example 2 would be better to hold solids while stationary as a result of the greater viscosities at low shear rates while simultaneously exhibiting a need for less power during drilling fluid circulation as a result of the lesser viscosity at high shear rates when compared with Comparative Example 1.

Example 2 drilling fluid showed gel characteristics, such that they would gel as soon as stress is removed. This correlates to a drilling fluid which would gel as soon as drilling is halted such that the drilling fluid would effectively support cuttings.

TABLE 3

Oil-Based Drilling Fluids: % Strain and Separation

| Oil-Based Drilling Fluid | % Strain when deformed at 50° C. | Sagging | Fluid Separation |
|---|---|---|---|
| Comparative Example 1 | 0.399 | No | Trace |
| Example 2 | 0.402 | No | Trace |

Figure 2:
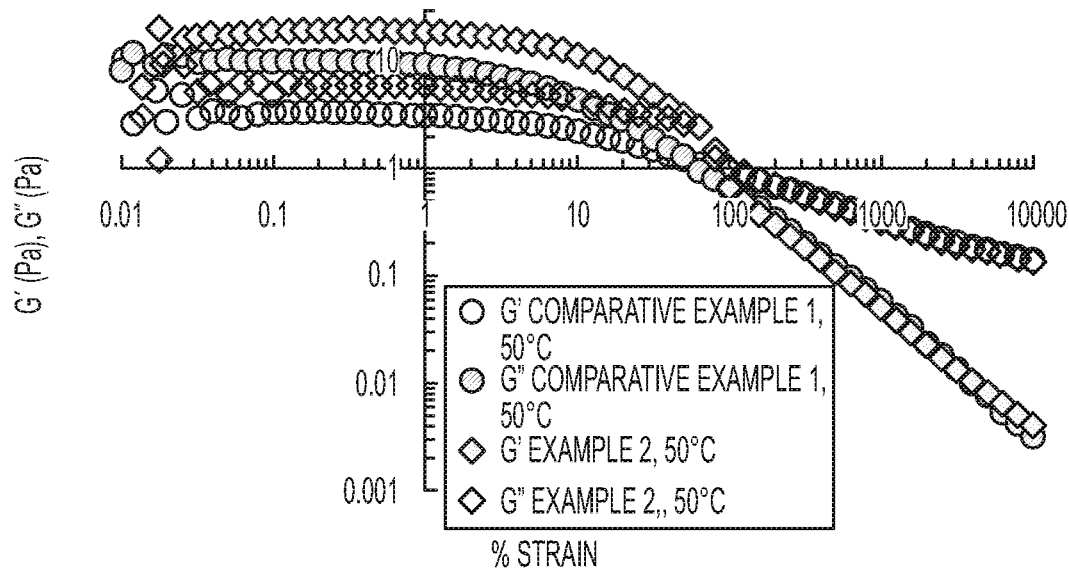
FIG. 2 provides a graph of the storage modulus (G') and the loss modulus (G") of various tested drilling fluids as a function of percent strain at 50° C.
Figure 3:
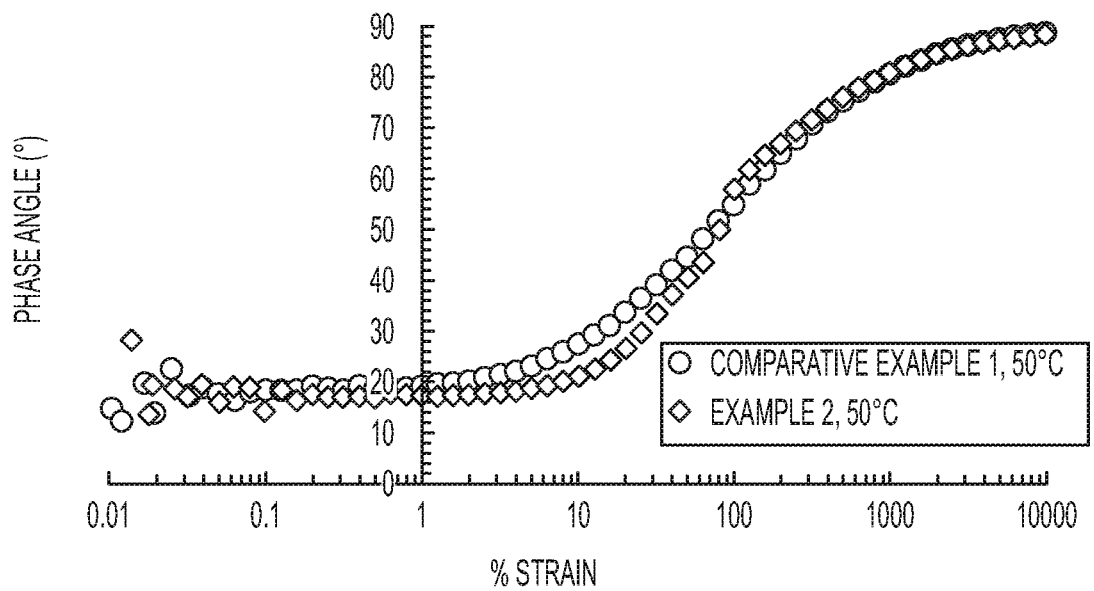
FIG. 3 provides a graph of the phase angle of various tested drilling fluids as a function of percent strain at 50° C.

Both Example 2 and Comparative Example 1 did not show sagging and demonstrated only trace separation after standing static for 17 hours after preparation. Both Example 2 and Comparative Example 1 deformed at approximately the same strain at 50° C., as shown in Table and FIGS. 2-3, therefore both would require similar power to initiate circulation. Additionally, as shown in FIG. 2, Example 2 became more fluid (G">G') at lower strains than Comparative Example 1, thereby requiring less power during circulation. In FIG. 3, the phase angles of Example 2 and Comparative Example 1 also confirmed that Example 2 becomes more fluidic at lower strains than Comparative Example 1 at 50° C.

In FIGS. 2 and 3, the storage modulus (G'), loss modulus (G") and phase angle measurements as a function of % strain were monitored at a constant frequency of 1 radian per second (rad s$^1$) and temperatures of 0° C. and 50° C. from % strain of 0.01 to 10000 to identify the linear viscoelastic region. The test involves applying small incremental oscillating (clockwise then counter-clockwise in rotation) stresses to the mud and monitoring its resulting strain (i.e. deformation) response. These measurements could also be used to identify the strength of the dispersion structure (settling stability) and resilience. G', G" and phase angle relate to the viscoelastic properties of the fluid. G' describes the elastic properties of the drilling fluid while G" describes the viscous properties of the drilling fluid. Therefore when G' is greater than G" the drilling fluid behaves like a solid material and when less than G" then as liquid. Gelled fluids initially show linear viscoelastic region at low strains, but G' and G" decrease as % strain increases, G' eventually becoming less than G" and resulting an an increase in phase angle. Phase angle is G"/G' where the phase angle of a Newtonian fluid such as water is 90°. It is noted that the stronger the gel, the greater the strain required to break the gel, hence requiring more power to start the circulation.

Example 2 and Comparative Example 1 were tested for thermal stability. Thermal stability was tested using thermogravimetric analysis (TGA). The TGA demonstrated Example 2 retained thermal stability until 170° C. while Comparative Example 1 demonstrated thermal stability until only 100° C.

It should be understood that the various aspects of the oil-based fluid composition, method of making the same, and method for drilling a subterranean well utilizing the same are described and such aspects may be utilized in conjunction with various other aspects.

In a first aspect, the disclosure provides an oil-based drilling fluid composition. The oil-based drilling fluid composition includes an oil phase having a base oil; an aqueous phase; at least one emulsifier; and one or more additives chosen from a wetting agent, a rheology modifier, a fluid-loss control additive, and a weighting additive. The at least one emulsifier comprises an amino amide comprising the formula R—CO—NH—R'—NH—R"—NH$_2$, where R is a fatty acid alkyl and R' and R" are alkyl groups.

In a second aspect, the disclosure provides the drilling fluid of the first aspect, in which the disclosure provides the drilling fluid of the first aspect, in which R is selected from $C_{15}H_{31}$, $C_{17}H_{35}$, $C_{21}H_{43}$ or $C_8$—$H_{17}CHCHC_7H_{14}$.

In a third aspect, the disclosure provides the drilling fluid of any of the first or second aspects, in which R' is selected from $C_2H_4$, $C_6H_{12}$ or $C_{10}H_{20}$.

In a fourth aspect, the disclosure provides the drilling fluid of any of the first through third aspects, in which R" is selected from $C_2H_4$, $C_6H_{12}$ or $C_{10}H_{20}$.

In a fifth aspect, the disclosure provides the drilling fluid of the first aspect, in which R is $C_{17}H_{35}$, R' is $C_2H_4$, and R' is $C_2H_4$.

In a sixth aspect, the disclosure provides the drilling fluid of any of the first through fifth aspects, in which the oil-based drilling fluid comprises from 10% by weight to 20% by weight base oil, based on the total weight of the oil-based drilling fluids.

In a seventh aspect, the disclosure provides the drilling fluid of any of the first through sixth aspects, in which the oil-based drilling fluid comprises from 0.05% by weight to 5.0% by weight emulsifier, based on the total weight of the oil-based drilling fluids.

In an eighth aspect, the disclosure provides the drilling fluid of any of the first through seventh aspects, in which the oil-based drilling fluid comprises from 0.1% by weight to 2.0% by weight wetting agent, based on the total weight of the oil-based drilling fluids.

In a ninth aspect, the disclosure provides the drilling fluid of any of the first through eighth aspects, in which the oil-based drilling fluid comprises from 0.1% by weight to 2.0% by weight rheology modifier, based on the total weight of the oil-based drilling fluids.

In a tenth aspect, the disclosure provides the drilling fluid of any of the first through ninth aspects, in which the oil-based drilling fluid comprises from 0.5% by weight to 2.0% by weight fluid-loss control additive, based on the total weight of the oil-based drilling fluids.

In an eleventh aspect, the disclosure provides the drilling fluid of any of the first through tenth aspects, in which the oil-based drilling fluid comprises from 3.0% by weight to 5.0% by weight brine solution, based on the total weight of the oil-based drilling fluids.

In a twelfth aspect, the disclosure provides the drilling fluid of any of the first through eleventh aspects, in which the oil-based drilling fluid comprises from 64% by weight to 85.3% by weight weighting additive, based on the total weight of the oil-based drilling fluids.

In a thirteenth aspect, the disclosure provides the drilling fluid of any of the first through twelfth aspects, in which the oil-based drilling fluid comprises from 0.1% by weight to 2.5% by weight of the emulsifier, based on the total weight of the oil-based drilling fluids.

In a fourteenth aspect, the disclosure provides the drilling fluid of any of the first through thirteenth aspects, in which the rheology modifier comprises one or more of an organophilic clay, a hectorite clay, a dimeric fatty acid, a trimeric fatty acid, a polyamine, a sepiolite, and an attapulgite.

In a fifteenth aspect, the disclosure provides the drilling fluid of any of the first through fourteenth aspects, in which the weight additive comprises one or more of barite, calcite, aragonite, iron carbonate, zinc carbonate, manganese tetroxide, zinc oxide, zirconium oxide, hematite, ilmenite, and lead carbonate.

In a sixteenth aspect, the disclosure provides the drilling fluid of any of the first through fifteenth aspects, in which the viscosity at a shear rate of 10.22 s$^{-1}$ measured at 50° C. is greater than 400 cP.

In a seventeenth aspect, the disclosure provides the drilling fluid of any of the first through sixteenth aspects, in which the viscosity at a shear rate of 170 s$^{-1}$ measured at 50° C. is less than 125 cP.

In an eighteenth aspect, the disclosure provides a method for making an oil-based drilling fluid composition. The method includes mixing a base oil, at least one emulsifier, and optionally at least one wetting agent to form a first mixture in which the at least one emulsifier includes an amino amide having the formula R—CO—NH—R'—NH—R"—NH$_2$, where R is a fatty acid alkyl and R' and R" are alkyl groups. The method further includes optionally, mixing at least one rheology modifier, and a alkalinity adjuster into the first mixture to form a second mixture; optionally, mixing at least one fluid-loss control additive into the second mixture to form a third mixture; mixing a brine solution into the first mixture or the third mixture to form a fourth mixture; and mixing a weighting additive into the fourth mixture to form the oil-based drilling fluid composition:

In a nineteenth aspect, the disclosure provides the method of the eighteenth aspect, in which R is selected from $C_{15}H_{31}$, $C_{17}H_{35}$, $C_{21}H_{43}$ or $C_8H_{17}CHCHC_7H_{14}$.

In a twentieth aspect, the disclosure provides the method of any of the eighteenth or nineteenth aspects, in which R' is selected from $C_2H_4$, $C_6H_{12}$ or $C_{10}H_{20}$.

In a twenty-first aspect, the disclosure provides the method of any of the eighteenth through twentieth aspects, in which R" is selected from $C_2H_4$, $C_6H_{12}$ or $C_{10}H_{20}$.

In a twenty-second aspect, the disclosure provides the method of any of the eighteenth through twenty-first aspects, in which R is $C_{17}H_{35}$, R' is $C_2H_4$, and R' is $C_2H_4$.

In a twenty-third aspect, the disclosure provides the method of any of the eighteenth through twenty-second aspects, in which the oil-based drilling fluid composition comprises from 10% by weight to 20% by weight base oil, based on the total weight of the oil-based drilling fluid composition.

In a twenty-fourth aspect, the disclosure provides the method of any of the eighteenth through twenty-third aspects, in which the oil-based drilling fluid composition comprises from 0.05% by weight to 5.0% by weight emulsifier, based on the total weight of the oil-based drilling fluid composition.

In a twenty-fifth aspect, the disclosure provides the method of any of the eighteenth through twenty-fourth aspects, in which the oil-based drilling fluid composition comprises from 0.1% by weight to 2.0% by weight wetting agent, based on the total weight of the oil-based drilling fluid composition.

In a twenty-sixth aspect, the disclosure provides the method of any of the eighteenth through twenty-fifth aspects, in which the oil-based drilling fluid composition comprises from 0.1% by weight to 2.0% by weight rheology modifier, based on the total weight of the oil-based drilling fluid composition.

In a twenty-seventh aspect, the disclosure provides the method of any of the eighteenth through twenty-sixth aspects, in which the oil-based drilling fluid composition comprises from 0.5% by weight to 2.0 by weight fluid-loss control additive, based on the total weight of the oil-based drilling fluid composition.

In a twenty-eighth aspect, the disclosure provides the method of any of the eighteenth through twenty-seventh aspects, in which the oil-based drilling fluid composition comprises from 3.0% by weight to 5.0% by weight brine solution, based on the total weight of the oil-based drilling fluid composition.

In a twenty-ninth aspect, the disclosure provides the method of any of the eighteenth through twenty-eighth aspects, in which the oil-based drilling fluid composition comprises from 64% by weight to 85.3% by weight weighting additive, based on the total weight of the oil-based drilling fluid composition.

In a thirtieth aspect, the disclosure provides the method of any of the eighteenth through twenty-ninth aspects, in which the oil-based drilling fluid composition comprises from 0.1% by weight to 2.5% by weight of the emulsifier, based on the total weight of the oil-based drilling fluid composition.

In a thirty-first aspect, the disclosure provides the method of any of the eighteenth through thirtieth aspects, in which the rheology modifier comprises one or more of an organophilic clay and a hectorite clay.

In a thirty-second aspect, the disclosure provides the method of any of the eighteenth through thirty-first aspects, in which the weight additive comprises one or more of barite, hematite, ilmenite, calcite, aragonite, iron carbonate, zinc carbonate, manganese tetroxide, zinc oxide, zirconium oxide, and lead carbonate.

In a thirty-third aspect, the disclosure provides the method of any of the eighteenth through thirty-second aspects, in which the viscosity of the oil-based drilling fluid composition at a shear rate of 10.22 s$^{-1}$ measured at 50° C. is greater than 400 cP.

In a thirty-fourth aspect, the disclosure provides the method of any of the eighteenth through thirty-third aspects, in which the viscosity of the oil-based drilling fluid composition at a shear rate of 170 s$^{-1}$ measured at 50° C. is less than 125 cP.

In a thirty-fifth aspect, the disclosure provides a method for drilling a subterranean well. The method includes providing an oil-based drilling fluid composition according to any one of the first through seventeenth aspects; and introducing the oil-based drilling fluid composition into a wellbore.

In a thirty-sixth aspect, the disclosure provides the method of the thirty-fifth aspect, in which the method further includes operating a drill in the wellbore.

In a thirty-seventh aspect, the disclosure provides the method of any of the thirty-fifth or thirty-sixth aspects, in which the wellbore has a wellbore temperature greater than 300° F. (148.9° C.).

In a thirty-eighth aspect, the disclosure provides the method of any of the thirty-fifth through thirty-seventh aspects, in which the wellbore has a wellbore pressure greater than 10,000 psi (68,948 kPa).

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims included in this application should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

The invention claimed is:

1. A method for drilling a subterranean well, the method comprising:
   providing an oil-based drilling fluid composition; and
   introducing the oil-based drilling fluid composition into a wellbore;
   wherein the oil-based drilling fluid composition comprises:
      an oil phase comprising a base oil;
      an aqueous phase comprising water;
      at least one emulsifier, in which the at least one emulsifier comprises an amino amide comprising the formula R—CO—NH—R'—NH—R"—NH$_2$, where R is a fatty acid alkyl and R' and R" are alkyl groups; and
      one or more additives chosen from a wetting agent, a rheology modifier a fluid-loss control additive, and a weighting additive.

2. The method of claim 1, where the method further comprises operating a drill in the wellbore.

3. The method of claim 1, where the wellbore comprises a wellbore temperature greater than 300° F.

4. The method of claim 1, where the wellbore comprises a wellbore pressure greater than 10,000 psi.

5. The method of claim 1, where R is selected from $C_{15}H_{31}$, $C_{17}H_{35}$, $C_{21}H_{43}$ or $C_8H_{17}CHCHC_7H_{14}$.

6. The method of claim 1, where R' is selected from $C_2H_4$, $C_6H_{12}$ or $C_{10}H_{20}$.

7. The method of claim 1, where R" is selected from $C_2H_4$, $C_6H_{12}$ or $C_{10}H_{20}$.

8. The method of claim 1, where R is $C_{17}H_{35}$, R' is $C_2H_4$, and R' is $C_2H_4$.

9. The method of claim 1, where the oil-based drilling fluid comprises from 0.05% by weight to 5.0% by weight emulsifier, based on the total weight of the oil-based drilling fluids.

10. The method of claim 1, where the oil-based drilling fluid comprises from 0.1% by weight to 2.0% by weight rheology modifier, based on the total weight of the oil-based drilling fluids.

11. The method of claim 10, where the rheology modifier comprises one or more of an organophilic clay, a hectorite clay, a dimeric fatty acid, a trimeric fatty acid, a polyamine, a sepiolite, and an attapulgite.

12. The method of claim 1, where the oil-based drilling fluid comprises from 64% by weight to 85.3% by weight weighting additive, based on the total weight of the oil-based drilling fluids.

13. The method of claim 12, where the weight additive comprises one or more of barite, calcite, aragonite, iron carbonate, zinc carbonate, manganese tetroxide, zinc oxide, zirconium oxide, hematite, ilmenite, and lead carbonate.

14. The method of claim 1, where the viscosity at a shear rate of 10.22 s$^{-1}$ measured at 50° C. is greater than 400 cP.

15. The method of claim 1, where the viscosity at a shear rate of 170 s$^{-1}$ measured at 50° C. is less than 125 cP.

* * * * *